United States Patent [19]

Craig et al.

[11] 4,397,185

[45] Aug. 9, 1983

[54] INERTIAL INSTRUMENT WITH CUP-SHAPED INERTIAL MASS

[75] Inventors: Robert J. G. Craig, Los Angeles; James J. Imbault; John E. Fitzgerald, both Camarillo, all of Calif.

[73] Assignee: Incosym, Inc., Westlake Village, Calif.

[21] Appl. No.: 262,993

[22] Filed: May 12, 1981

[51] Int. Cl.³ .............. G01C 19/08; G01C 19/16; G01P 15/13
[52] U.S. Cl. ............................ 73/504; 73/517 B; 74/5 F
[58] Field of Search .......... 73/517 B, 516 R, 504; 74/5 R, 5 F, 5.6 D, 5.6 E

[56] References Cited

U.S. PATENT DOCUMENTS

| | | | |
|---|---|---|---|
| 3,131,564 | 5/1964 | Romberg | 73/517 B X |
| 3,347,105 | 10/1967 | Polushkin et al. | 74/5.6 E |
| 3,413,858 | 12/1968 | Samet | 74/5 F |
| 3,690,187 | 9/1972 | Morris | 73/517 B |
| 4,189,948 | 2/1980 | Buckley et al. | 74/5.6 E |
| 4,286,370 | 9/1981 | Craig | 74/5 F |

*Primary Examiner*—James J. Gill
*Attorney, Agent, or Firm*—Marvin H. Kleinberg

[57] ABSTRACT

An inertial instruments uses a suspension structure that is exterior to and surrounds a cup shaped inertial mass which carries torquing magnets within the cup. Torquer coils are also located within the cup. In a preferred embodiment, axially magnetized disc magnets within the cup cooperate with toroidal torquer coils. In other embodiments segmented or bar magnets are used. The instrument can be used either as a gyroscope by coupling the suspension to a rotor, or as an accelerometer.

44 Claims, 6 Drawing Figures

INERTIAL INSTRUMENT WITH CUP-SHAPED INERTIAL MASS

INTRODUCTION

The present invention relates to inertial instruments and, more particularly, an instrument having a flexible suspension interconnection between the inertial element and the reference structure.

It has been recognized that virtually the same component elements can be used to create a one or two-degree of freedom accelerometer as are used to create a dynamically turned, free rotor gyroscope having two degrees of freedom. The primary difference would be that the gyroscope rotates while the accelerometer does not. With a simpler suspension permitting only one degree of freedom, the single degree of freedom accelerometer can be created from substantially the same components.

This family of instruments can share common sensing and control elements such as pick-offs and torques, as well as other components such as magnets, housings, covers and the like. The pickoffs signal the deviation of the inertial mass element from a predetermined rest or reference plane. The torquers apply restoring forces to return the mass element to the rest plane.

RELEVANT PRIOR ART

The following patents are considered relevant prior art in their disclosure of dynamically tuned free rotor gyros:

E. W. Howe, U.S. Pat. No. 3,301,073;
H. F. Erdley, et al, U.S. Pat. No. 3,318,160;
W. J. Krupick, et al, U.S. Pat. No. 3,354,726; and
H. F. Erdley, et al, U.S. Pat. No. 3,678,764.

The following patents are considered relevant for their teaching of flexures and gimbal systems for dynamically tuned free rotor gyros:

J. C. Stiles, U.S. Pat. No. 3,452,608;
D. Barnett, U.S. Pat. No. 3,543,301;
W. B. Ensinger, U.S. Pat. No. 3,585,866;
R. J. G. Craig, U.S. Pat. No. 3,832,906;
S. F. Wyse, U.S. Pat. No. 3,943,778;
R. J. G. Craig, et al, U.S. Pat. No. RE 30,290;
R. J. G. Craig, et al, U.S. Pat. No. 3,143,451; and
R. J. G. Craig, Ser. No. 822,384, now abandoned in favor of continuation application Ser. No. 06/150742.

In recent years, considerable interest has been shown in what has come to be known as dynamically tuned free rotor gyroscopes in which the rotor and shaft are connected through some type of a flexible universal joint. Such gyros have been described in detail. The section on related prior art lists many patents which in turn include references to yet still additional prior art.

These instruments have been built so that a central shaft is connected through flexural pivots to a mass element which surrounds the shaft. In the case, electromagnetic pick-offs are provided to signal changes in attitude from the plane normal to the spin axis. The mass element is provided with a magnet structure that interacts with torquer coils that apply force to the mass element to restore it to the normal plane.

If the central shaft is connected to a motor so that the inertial mass element is rotated, then the instrument becomes a gyroscope. If, on the other hand, the central shaft is merely fastened to a support frame, then the device could, just as easily, and with the same pick-offs and torquers, function as an accelerometer if the center of mass is displaced with respect to the suspension flexural pivot axes.

It has always been a desirable goal to provide smaller, more compact inertial instrumets having the performance characteristics of their larger counterparts. Certainly, for inertial navigation and/or guidance, size and weight is always a factor.

A number of applications now exist for instruments in which the diameter is the most important dimension and length is not critical. In some instances, the desired diameter is less than one inch. For these applications, the present invention may provide the only practical way of achieving the goal.

For use in more sophisticated applications, reductions in size and weight, without loss of accuracy, stability or repeatability are highly prized goals.

As the size of the inertial instrument is reduced, the flexures connecting the inertial mass to the shaft must become smaller and smaller, creating fabricating problems. Further, in current, state-of-the-art instruments, and especially gyros, expensive, segmented magnets are placed about the periphery of the mass element which then interact with torquer coils to maintain the normal plane of the mass element.

In designing inertial instruments, and especially dynamically tuned free rotor gyroscopes, a design goal has been to place a substantial part of a mass of the rotating element at a distance from the spin axis. Where size is not a critical factor, the suspension can easily be positioned between the shaft and the rotating element. Various suspensions have been disclosed and taught in the prior art patents listed herein.

Some of these prior art gyros include the further design feature of shaping the mass element into a toroidal shape with an opening between the inner and outermost wall and positioning, in the interior, stationary torquer coils which cooperate with permanent magnets that are mounted on an interior surface of the toroid.

To decrease the overall size of such a gyro would require a proportional decrease in size of all of the component elements. This would lead to severe problems in the fabrication of the suspension and also in the fabrication and assembly of the permanent magnets which are affixed to the mass element and which interact with the torquer coils.

In addressing the problem of creating a small inertial instrument having a diameter of less than one and a half inches, the several problems created by the size reduction can be considered. A change in the suspension to simplify the complexity of fabrication and reduce the cost can contribute to the achievement of such a design goal. Further, a change in the permanent magnet assemblies can increase efficiency and at the same time reduce the power requirements for the torquers.

SUMMARY OF THE INVENTION

According to the present invention, a new inertial instrument is created which, in various embodiments, can be either a gyroscope or an accelerometer. A number of improvements have been evolved which can be used individually or in combination. By employing a wholly new inertial mass design, together with a novel suspension configuration, improved, more efficient and less expensive permanent magnet arrangements can be devised, as well, which can work with the conventional pick-off and torquer elements of prior art devices.

One of the keys to the improved family of inertial instrument of the present invention is the provision of an inertial mass element which is substantially cup-shaped. Preferably the mass element is a section of a hollow cylinder having a solid base, the open end having a flange. A suspension structure, such as is taught in the Craig or Craig, et al. patents, is coupled to the flange so that the inertial element rests wholly in the interior of the suspension. When used as a gyro, the opposite end of the suspension is coupled to a source of rotational motion. If used as an accelerometer, the opposite end of the suspension is connected to the base of the instrument.

In another embodiment, part of the rotor extends out beyond the diameter of the suspension. This increases the angular momentum of the instrument but still allows most of the features of the present design to be used.

As in prior devices, torquer coils can be arranged to extend into the interior of the cup to interact with permanent magnets that are located therein. In a preferred embodiment, disc magnets, stacked within the cup and polarized in an axial direction provide the permanent magnetic field.

In a preferred embodiment, a stack of three magnets is used. A primary, central disc magnet is placed between a pair of secondary, disc magnets which function as "bucking magnets." The "north" face of the main magnet is adjacent the north face of one bucking magnet which tends to direct the lines of flux in the radial direction. Similarly, the adjacent south faces of the main and secondary magnets also produces a radial return flux path.

The circumferential wall of the cup shaped inertial mass element acts as a part of the flux path. Obviously, a single disc magnet can be employed, but without the same degree of efficiency in flux utilization. More than three magnets can also be used, if desired.

A "spreader" or pole piece element between adjacent magnets helps to concentrate and direct the flux path. The bucking magnets also tend to isolate the instrument from the effects of external magnetic fields. It appears that the available magnetic field can reduce the power requirements of the torquers.

Axial magnetization of disc magnets results in a very efficient magnetic design since nearly all available flux passes through the torquer coil windings. Axially magnetized rings or segments, for example, would not be as efficient since a considerable amount of flux is lost through leakage.

The use of the disc permanent magnets avoids the necessity of a plurality of carefully matched individual magnets which, in prior art designs, were adhered circumferentially to the walls of the mass element adjacent the torquer coils.

A fundamental problem present in conventional strap down gyros is overcome using the teachings of the present invention. In prior art gyros, in order to obtain efficient torquing, a plurality of permanent magnetic segments were preferable since it is difficult to generate enough flux inside a solid ring to magnetize it to the same level as a segment exposed to the same flux.

Using the segments in a rotor, however, creates "noise" in the torquer coils. For example, a ring of nine segments when rotated creates noise at a frequency that is nine times the spin frequency, and subharmonics, as well. These "noise" effects can create problems in other parts of the system such as the caging electronics. Since the preferred embodiment does not use a segmented structure, this noise problem does not exist.

In prior art instrument designs, a plurality of torquer coils cooperated with permanent magnets that were arranged around the periphery of the rotor. These magnets were polarized in the plane orthogonal to the axis of symmetry, which in gyros, was the spin axis. In such an arrangement, all of the available flux does not interact with the torquer coils. This situation is somewhat improved in embodiments in which the inertial mass element is an open toroid. Here, rings of specially shaped magnet segments were on the facing inner walls of the toroidal element. The torquer coils were then positioned between the magnet rings.

Any improvement in the efficiency of the torquers can reduce the torquer power requirements of the instrument. For example, an increase in the amount of magnetic flux available to interact with the torquer coils, can be achieved using stronger permanent magnets. However, size limitations and the problems of fabricating such more powerful magnets in the required shapes can cause a disproportionate increase in costs.

An inherent feature of this invention is that the torquer coils and pickoff coils are mounted at an end of the gyro rather than the center. The end surface of the gyro is a very convenient place to do all interconnect wiring and also allows a single inexpensive multi-pin header to replace many individual feedthroughs.

A conventional dry-tuned gyro uses feedthroughs which extend out radially from a diameter near its center. This arrangement makes interconnecting wiring more difficult and also increases the effective diameter of the gyro. For those situations where a small diameter is essential, such as some missile and borehole applications, the end-mounted header allows a gyro with a larger diameter rotor and suspension to be used, since no diameter is wasted by use of radial feedthroughs.

The end-mounted header also allows direct attachment of either a mating plug or electronic circuits or both. If electronic circuits are used, the boards can be stacked on the feedthrough pins with selective electrical connections to the circuits as required. This arrangement results in a minumum volume, low cost package.

In yet another embodiment of a family of inertial instruments, the stack of disc magnets can be replaced with a single bar magnet polarized in a direction orthogonal to the cylindrical axis. A single multi-turn toroidal torquer coil concentric with the cylindrical axis is provided to interact with the magnet. For gyro embodiments, torquing impulses would have to be provided in predetermined synchronism with the rotation of the gyroscope so that the magnet and rotor would be oriented properly each time a restoring impulse is implied.

An advantage of this arrangement is that the full height of the mass element has magnetic flux present. The toroidal torquer coil has more turns in the flux field than with the prior art arrangements. As a result, more torque can be applied to the mass element with less torquer power.

For a one axis accelerometer, this embodiment creates no special problems since the magnet can be accurately positioned with respect to the pivot axis of the gimbal. For the gyro application, since the bar rotates with the rotor, the application of torquing pulses must be accurately synchronized to the position of the magnet relative to the pivot axes. A two axis accelerometer may require a second bar magnet and a second torquer coil.

The suspension system, which can be made according to the teachings of the Craig applications, supra., is provided with an inside diameter, sufficient to accommodate the inertial mass element. In the gyro version, the suspension is connected between a motor and the mass element. In the accelerometer version, the suspension is fastened to the reference frame. The rotation axes of the flexures are coincident with the center of mass of the gyro rotor but in the accelerometer, the rotation axes are displaced either axially or radially from the center of mass to impart a pendulosity.

In the preferred embodiment, the suspension and shaft are fabricated from a single piece of material and are permanently attached to each other. Besides the cost savings realized during fabrication, this arrangement improves the geometric relationship between the suspension and shaft and insures that it remains fixed for the life of these items.

This fixed relationship and improved geometry increase performance and allow final tuning and balancing to be accomplished in a test fixture rather than in the actual instrument. Since this fixture can be designed specifically for turning and balancing, it can be designed to provide better access and to have other features not available in the gyro itself. This one-piece suspension/-shaft construction thus allows more efficient tuning and balancing.

In another embodiment, the shaft and suspension as well as the bearing inner races are constructed from a single piece of material and are all permanently attached together. This embodiment improves the geometric relationship of the suspension to the shaft as well as to the bearings. This improved geometry should result in improved performance.

In a different embodiment, the center of mass of the mass element is displaced radially from the center of suspension along an axis orthogonal to the rotational axes of the suspension. This results in a single axis accelerometer with the sensing axis orthogonal to the sensing axes of the two-axis instrument. The advantage of this embodiment is that a one axis and two axis instrument can be placed end to end, a most convenient packaging arrangement, to produce a device sensitive to accelerations along three, mutually orthogonal axes.

By increasing the overall size of the suspension structure, the flexures are more easily fabricated. Further, the separation cuts can be made by more conventional machining methods, other than EDM. When substantially smaller instruments are desired, the arrangement of the present invention avoids the problems attendant upon fabricating even smaller flexures in a suspension that couples a motor shaft to a substantially toroidal rotor.

The accessability of the suspension structure also permits direct adjustment of the suspension and mass combination for balance, tuning and 2 N (twice spin frequency), effects, without the need for repeated disassembly, especially as applied to the gyro embodiment.

The flexure blades can be sandblasted to change the effective spring rate, or the blades can be etched either chemically, or by some other similar process to achieve the same result. Further, the gimbal itself can be drilled to reduce inertia or weights can be added to increase inertia.

As is known from the prior art, the spin frequency is a direct function of the spring rate of the flexures but is an inverse function of the suspension inertia. Since both parameters can be controlled and modified, the tuning process can be simplified and, for final tuning, the instrument need not be dissassembled.

In most respects the construction of the instruments can be quite conventional, utilizing known motors and pick-offs, and, in the preferred embodiments, torquer coils.

In an alternative embodiment, disc magnets are replaced with a single, bar magnet, necessitating a change in the shape the torquer coils. A single, multiturn circumferential coil interacts with the bar magnet.

Several advantages of the improved instrument of the present invention have been noted during the testing of experimental models. For example, the greater mass and inertia of the suspension structure tends to damp bearing "noise." Even though such bearing noise is a "second order" effect, by minimizing such effects, the performance of the instrument can be improved.

The improved magnetic coupling provided by the design of the present invention has resulted in an unexpected improvement in an operating parameter known as the "time constant." This generally represents the time required for a rotor, which has been deflected out of the "rest" plane to return to the rest plane. Ideally, a rotor, once displaced out of a plane orthogonal to the spin axis should remain displaced in the absence of restoring forces. In a perfect gyro, the system includes no restoring forces. However, a commercially produced gyro will have various restoring forces arising, for example, from friction, stray fluxes and the like, so that, in any gyro, a finite time constant can be measured.

In the design of a gyro, the time constant can be predicted, based upon the performance of prior similar designs. A time constant was predicted for the gyro of the preferred embodiment based upon the design parameters. However, when tested, it was found that the actual time constant turned out to be approximately three times the predicted value, suggesting a most efficient magnetic design. It is believed that this result can be attributed to the novel magnetic design and the high efficiency resulting therefrom with very low leakage.

The novel features which are characteristic of the invention, both as to structure and method of operation thereof, together with further objects and advantages thereof, will be understood from the following description, considered in connection with the accompanying drawings in which several preferred embodiments of the invention are illustrated by way of example. It is to be expressly understood, however, that the drawings are for the purpose of illustration and description only, and are only intended as a definition of the limits of the invention.

DESCRIPTION OF THE DRAWINGS

The invention is illustrated, by way of example thereof, in the accompanying drawings, wherein.

Figure 1:
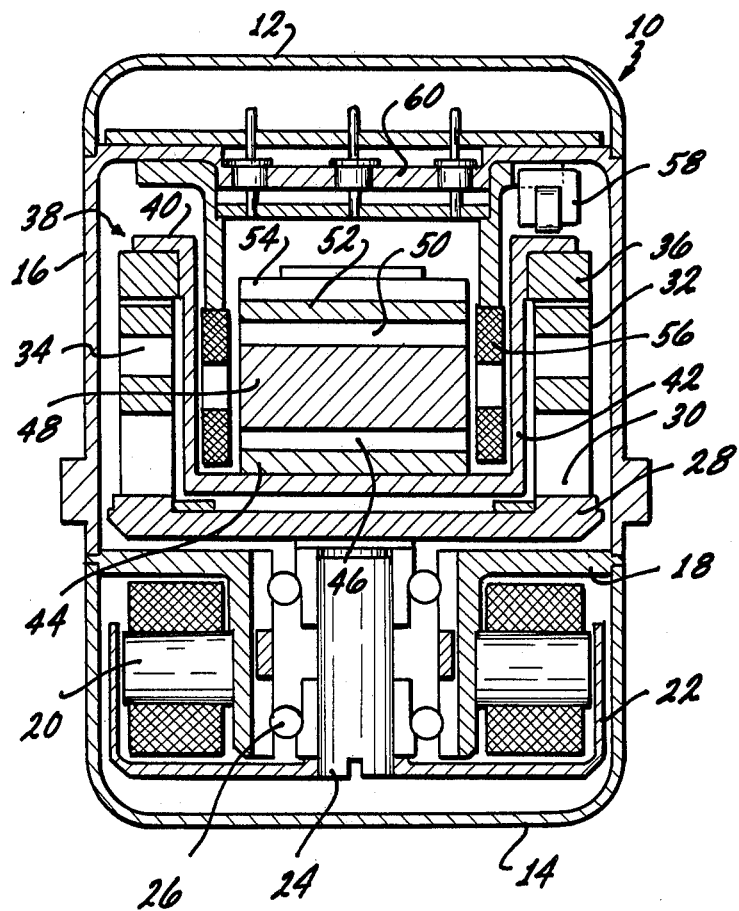
FIG. 1 is a side sectional view of a gyro according to the present invention.

Turning first to FIG. 1, there is shown in cross section a dynamically tuned, free rotor gyroscope 10 according to the present invention. As seen, gyro 10 is a two axis device and may be miniaturized to dimensions approximating one inch in diameter or smaller. The gyro 10 includes a top cover 12 and a bottom cover 14. An upper housing 16 surrounds the operational portion of the gyro. The top cover 12 seats against the upper part of the upper housing 16 and the bottom cover 14 encloses a motor portion which is fastened to a motor housing 18, coupled to the upper housing 16.

Attached to the motor housing 18 is a stator element 20. The motor further includes a hysteresis ring 22 which is connected to a shaft 24 that is supported by bearings 26. A suspension element 28 is connected to the shaft 24 and rotates with it. The suspension 28 is comprised of a base structure 30 which is firmly coupled to the shaft 24; a gimbal 32 which is connected to the base structure 30 by flexures 34 and to an upper portion 36 by flexures 34. The upper portion 36 is adapted to connect to a rotor 38. In the preferred embodiment, the shaft 24 and suspension 28 are fabricated from a single piece.

The upper portion 36 and rotor 38 tilt about a first gimbal axis which is orthogonal to the shaft 24 axis. The gimbal 32 tilts about a second gimbal axis that is orthogonal to the first gimbal axis and is also orthogonal to the spin axis.

As shown in FIG. 1, the rotor 38 is a cup-shaped member including a mounting flange 40 which extends over the upper portion 36 of the gimbal suspension and is fastened thereto. Arranged within the interior of the cup or rotor housing 42 is a first or lower bucking magnet 44. Resting on the lower bucking magnet is a first spreader or pole piece 46 which supports a main magnet 48. A second spreader or pole piece 50 separates the main magnet 48 from an upper bucking magnet 52. A third, upper spreader or pole piece 54 is placed over the upper bucking magnet 52 to channel flux and to enclose the magnetic field.

The rotor housing 42, as well as the pole piece/spreaders, 46, 50, 54 are magnetic conductors which establish a substantially closed magnetic field. The magnets 44, 48, 52 are discs which have been polarized in the axial direction. In the embodiment shown in FIG. 1, the main magnet 48 is arranged with its north pole facing the open end of the rotor housing 42 and its south pole facing the closed end. The lower bucking magnet 44 then has its south face adjacent the spreader-pole piece 46 and the upper bucking magnet 52 has its north face adjacent the second spreader-pole piece 50.

As in prior art designs, torquer coils 56 are wound substantially in an elongated round or race track shape. Four coils 56 are provided, two for each axis, provided by the flexures 34. The torquer coils 56 are arranged circumferentially and are positioned within the rotor housing 42, between the housing wall and the outer periphery of the magnet stack. As shown, the coils are arranged so that the windings intercept the main flux paths generated by the main magnet and bucking magnets.

The wall of the rotor housing 42 is magnetically conductive. The magnetic flux moves in a substantially closed path and is intercepted by the windings of the torquer coils 56.

Conventional pick-offs 58 (only one of which is shown) are employed and are positioned to detect the proximity of the flange 40 of the rotor 38. Two of the pick-offs 58 are aligned on opposite sides of the spin axis to detect rotation of the rotor in a first direction along a first gimbal pivot axis. A second pair of pick-offs 58 rotated 90° therefrom, detects rotation of the rotor 38 about a second gimbal pivot axis orthogonal to the first pivot axis.

As shown, a conventional, multi-lead header 60, such as would be commercially available from the semiconductor or connector industry, can be utilized to establish electrical connections to the interior of the gyro 10. The upper housing 16 and the bottom cover 14 can be sealed to isolate the interior before attaching the top cover 12. Electrical interconnections can be made through the header without affecting the interior.

The entire gimbal structure 28 and rotor housing 42 is accessible for adjustment and tuning before the upper housing 16 is sealed in place. For example, the flexures 34 can be tuned and the mass of the gimbal suspension 28 structure can be modified.

Once tuned and adjusted, the gyro 10 operates in more or less conventional fashion. The interaction of the hysteresis ring 22 with the electrically energized stator 20 causes the ring 22 and the shaft 24 to revolve, rotating the suspension 28 and the rotor 38. As long as the rotor 38 is not subjected to forces along its sensitive axes, it will continue to rotate in its rest plane and the pick-offs 58 will each be equally spaced from the flange 40 of the rotor 38.

If, however, the gyro is subjected to input forces or torques which cause the rotor 38 to "tilt" on the flexures 34, the pick-offs 58 will detect the differential proximities of the rotor flange 40.

As in the prior art, appropriate feedback circuits then apply "restoring" currents to the torquer coils 56 which generate a magnetic field which, when interacting with the magnetic flux field created by the permanent magnets, 44, 48, 52 applies a restoring force to the rotor 38 until the pick-offs 58 are equally affected again. In this respect, the operation is identical to that of a more conventional, dynamically tuned, free rotor gyro, such as is taught in the prior art patents, for example, to Craig, Craig et al, or Erdley.

Figure 2:
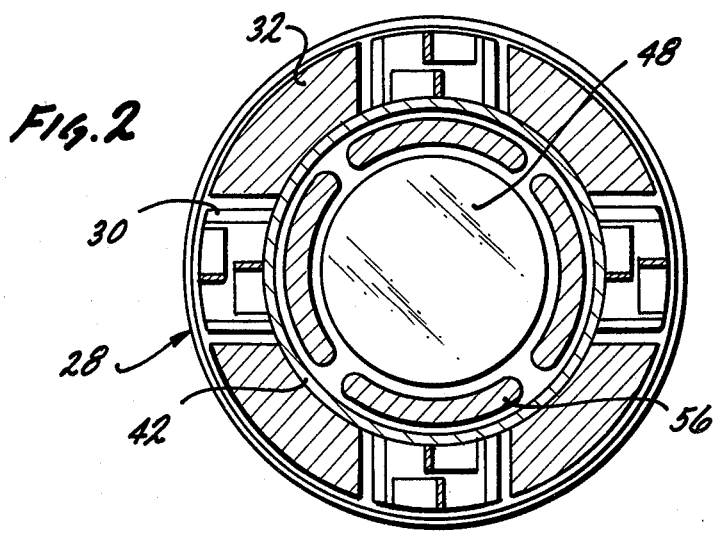
FIG. 2 is a top section view of the gyro of FIG. 1 taken along the lines 2—2 in the direction of the appended arrows.

Turning next to FIG. 2, there is shown in top section view, the arrangement of the magnetic components of the gyro 10 of FIG. 1. FIG. 2 provides a better view of the relationship of the rotor, and the components located therein. The suspension 28 as shown includes the base portion 30 and the floating gimbal 32. The rotor housing 42 is shown concentric with the suspension 28 and, within the rotor housing 42, can be seen the torquer coils 56 and the disc magnet 48.

As will be appreciated, as the suspension 28 rotates carrying the rotor 38 with it, the magnet 48 rotates, as well. The torquer coils 56 remain stationary relative to the rotation of the rotor 38.

Figure 3:
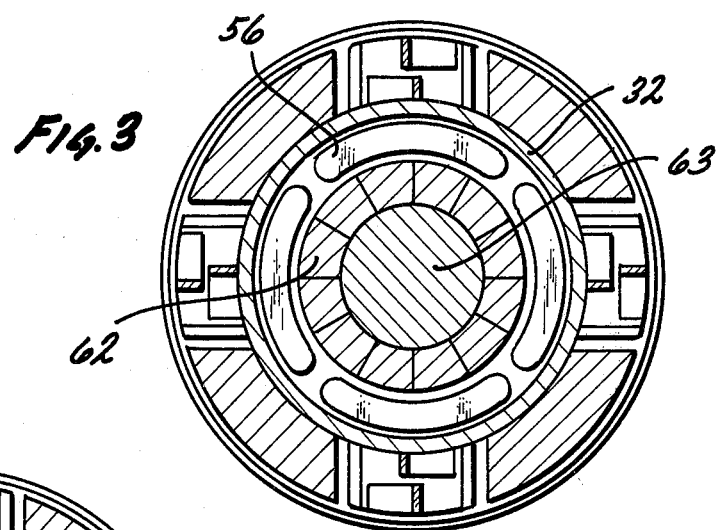
FIG. 3 is a top section view of an alternative embodiment according to the present invention, but utilizing conventional magnet structures.

Turning next to FIG. 3, wherein the same parts have been given the same reference numerals, there is shown an alternative embodiment of the present invention, in which a more conventional magnet structure is employed. Arranged within the rotor housing 42 are a plurality of shaped permanent magnet segments 62 which are polarized radially. The magnets segments surround a pole piece 63.

Torquer coils 56, as in FIG. 2, can be employed and the rotor body 42 forms a return path for the flux which path includes the rotor body, itself and the pole piece 63.

While the embodiment of FIG. 3 is a less preferable alternative, it is a possible arrangement which can take advantage of the "inside out" structure of the inertial instrument of the present invention. While lacking the advantages of the vastly improved magnetic flux distribution of the preferred embodiment, it does take advantage of existing magnetic technology, and includes the added advantages of the exterior suspension for a gyro or other inertial instrument of substantially reduced overall diameter.

Figure 4:
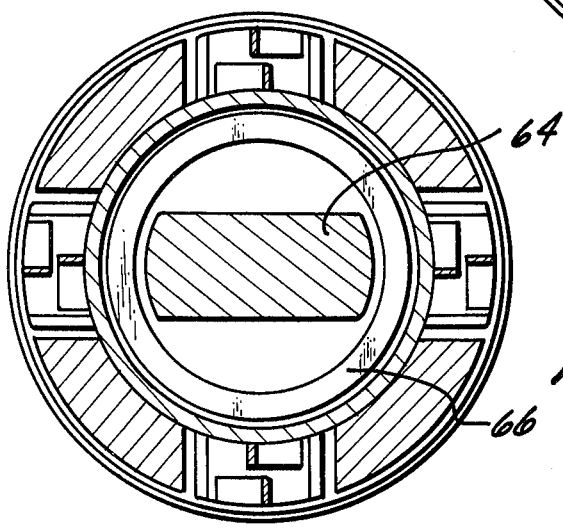
FIG. 4 is a top section view of yet a second alternative embodiment according to the present invention in which a bar magnet is utilized with a circumferential torquer coil.

In FIG. 4, there is yet a second alternative embodiment according to the present invention. Here an inertial instrument is provided with a bar magnet 64 within the gyro rotor housing 42, or, in the case of an accelerometer instrument, within the inertial mass element. A modified torquer coil 66 is positioned within the interior of the rotor housing 42 surrounding the bar magnet 64 and is a multi-turn concentric coil.

To make such an embodiment operable as an accelerometer with one degree of freedom, the magnet 64 must be lined up with its north/south axis arranged at right angles to the axis of rotation provided by the gimbal flexures. In the gyroscope embodiment, it is necessary to synchronize the application of torquing currents to the orientation of the bar magnet 64. The position of the bar magnet 64 relative to the pickoff 58 would have to be known at any time. Therefore, additional circuitry is required to generate the torquing signal at the proper time to effectively correct any displacement of the rotor.

Figure 5:
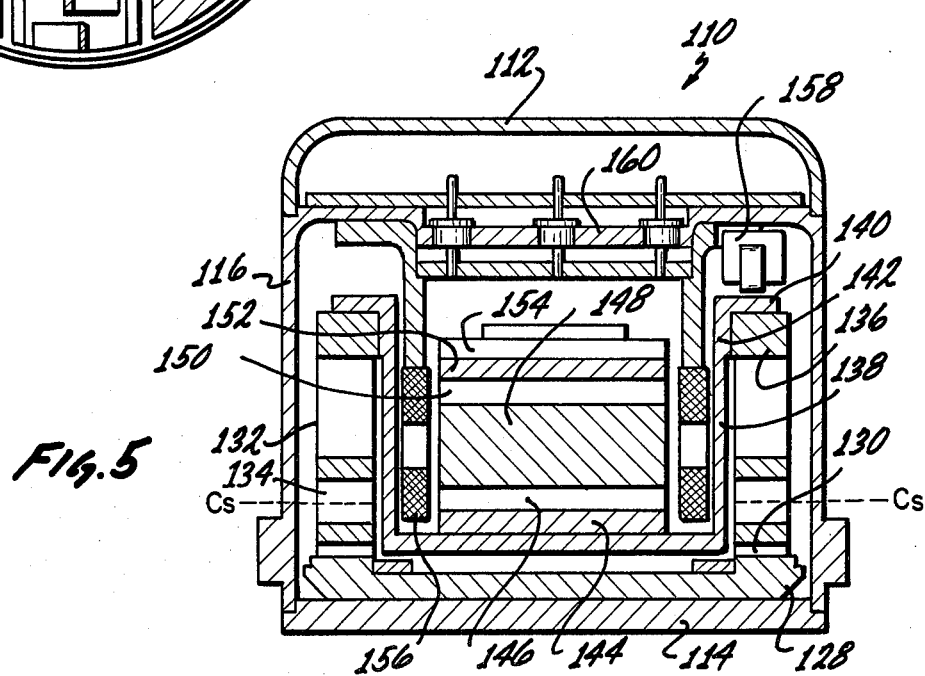
FIG. 5 is a side sectional view of a two-axis accelerometer instrument of the present invention, having two degrees of freedom.

In FIG. 5, there is illustrated an inertial instrument according to the present invention functioning as an accelerometer 110, similar in structure to the gyro of FIGS. 1 and 2. The accelerometer 110 has a top cover 112, a bottom cover, which corresponds to the lower housing 114, and an upper housing 116.

A suspension 128 element can be anchored to the lower housing member 114. The suspension 128 includes a base portion 130 which is coupled to a gimbal 132 by flexures 134.

As can be seen, the pivot axes $C_s$ of the suspension 128 is in a plane displaced substantially below the center of gravity of the inertial mass element which, for convenience, will be referred to as the "rotor" 138. An upper portion 136 of the suspension 128 is joined to the floating gimbal 132 by flexures (not shown) and supports a flange 140 of the rotor 138. The combination functions in substantially the same fashion in the gyroscope 10 embodiment of FIGS. 1 and 2.

Within the rotor housing 142 is placed a lower bucking magnet 144 on top of which is placed a spreader or pole piece 146. A main magnet 148 is provided, above which is a second spreader or pole piece 150, followed by an upper bucking magnet 152. As in the gyro embodiment an upper spreader pole piece 154 completes the magnetic structure. Further, as in the gyro embodiment, the magnets are discs polarized in the axial direction.

Torquer coils 156, as in the gyro embodiment, are located within the interior of the rotor 138 between the magnets and the wall of the rotor housing 142.

Pick-offs 158 can be identical to those used in the gyro 10. As in the gyro 10, a header 160 can be mounted on the structure supporting the torquer coils 156 to provide electrical connection to the interior of the intrument.

Because the plane of the center of suspension is below the center of mass, a pendulous accelerometer results. As in the gyro 10, a tilt of the mass element or rotor 138 can be detected by the pick-offs 158. This results in a restoring current being applied to the torque coils 156, which interact with the permanent magnets to return the rotor 138 to its normal, aligned position.

Figure 6:
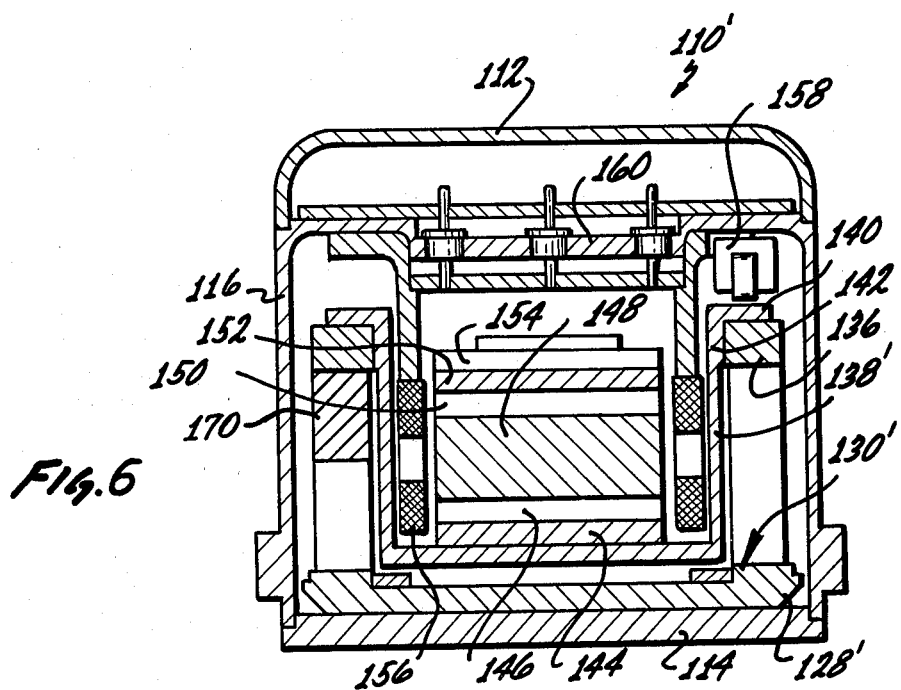
FIG. 6 is a side section view of an alternative one-axis accelerometer version having one degree of freedom.

Finally, in FIG. 6, there is shown a modified accelerometer which is designed to be sensitive to accelerations along a single axis which axis is parallel to the axis of symmetry.

An accelerometer 110′, substantially identical to the accelerometer 110 in FIG. 5 is employed. The primary difference in structure is that the center of suspension is made coincident with the center of mass of the inertial element as in the typical gyro configuration. However, a mass element 170 is added to the suspension structure 128′ to shift the center of mass in the radial direction along one of the suspension axes. This modification then renders the instrument 110′ sensitive to acceleration in the vertical direction as seen in FIG. 6. As modified, instrument 110′ is considered to have only a single axis of sensitivity. The mass element 170 can also be fabricated as a part of suspension.

The accelerometer 110 of FIG. 5 can also be modified to have a single axis of sensitivity by eliminating one pair of flexures. In that modification, the inertial mass would then be free to rotate only about one axis and would therefore be sensitive only to acceleration in a direction orthogonal to the suspension axis.

Thus there has been disclosed a novel inertial instrument which can be fabricated as a very small gyroscope or accelerometer and which, in a preferred embodiment, has a vastly improved magnetic flux path for interaction with torquer coils to reduce the currents required to restore the inertial mass element to a predetermined orientation.

The novel instrument of the present invention lends itself to modifications in which more conventional magnetic structure can be employed. Further, in an alternative embodiment, a different novel magnetic structure can be utilized employing a bar magnet, together with a concentric torquer coil, which, however, requires appropriate timing circuits when used in the gyroscope mode.

Other embodiments and variations will appear to those skilled in the inertial instrument art and the invention is to be limited in scope only by the scope of the claims appended hereto.

What is claimed as new is:

1. An inertial instrument having a central axis and including:
  (1) an inertial mass element having a substantially cup shape, coaxial with the central axis;
  (2) suspension means direct coupled to said mass element exterior to the outside of said cup shape;
  (3) flexure means symmetrically coupling said suspension means to a support structure for permitting limited rotation of said inertial mass element about a first axis orthogonal to the central axis;
  (4) pickoff means adjacent said inertial mass element for detecting and signalling rotational motion about said first axis; and
  (5) torquer means for imparting to said inertial element a rotational motion about said first axis.

2. The inertial instrument of claim 1 wherein said flexure means are located exterior to said cup shaped inertial mass element.

3. The inertial instrument of claim 1 further including permanent magnet means carried within said inertial mass element cup shape for generating a magnetic flux path extending generally at right angles to the central axis, whereby said torquer means acts upon said permanent magnet means.

4. The inertial instrument of claim 3 wherein said permanent magnet means include at least one disc magnet concentrically mounted within said cup shape.

5. The inertial instrument of claim 4 wherein said disc magnet is polarized in the direction of the central axis.

6. The inertial instrument of claim 3 wherein said permanent magnet means include a bar magnet mounted within said cup shape.

7. The inertial instrument of claim 6 wherein said torquer means include a circular coil concentric with the central axis extending into said cup shape between said bar magnet and the cup wall.

8. In an improved accelerator including a frame, and an insensitive axis, the combination comprising:
   (a) a cup shaped inertial mass element coaxially aligned with the insensitive axis;
   (b) flexural mounting means having a cylindrical opening adapted to receive said inertial mass element at the peripheral edge of said mass element and permitting said mass element limited rotational movement about at least a first axis orthogonal to the insensitive axis;
   (c) magnetic means disposed in the interior of the cup of said cup shaped mass element; and
   (d) torquer coil means fixed to a reference frame but extending into the cup interior adjacent to said magnetic means and co-operable therewith for maintaining said mass element in a plane orthogonal to the insensitive axis,
whereby said flexural mounting means is accessible for balancing and adjusting with the instrument otherwise assembled and operable.

9. The accelerometer of claim 8 whereby the plane including the center of mass of said inertial mass element is non-coplanar with the plane of said first axis.

10. The accelerometer of claim 9 wherein said flexural mounting means permits said mass element limited rotation motion about a second axis, orthogonal to and coplanar with said first axis.

11. The accelerometer of claim 8 further including a pendulous mass element coupled to said inertial mass element.

12. The accelerometer of claim 8 wherein said magnetic means include at least a first disc shaped permanent magnet polarized in a direction parallel to the insensitive axis.

13. The accelerometer of claim 12 wherein said magnetic means further include second and third disc magnets, respectively, adjacent said first disc magnet, polarized in a direction parallel to the insensitive axis and having similar poles adjacent said first magnet for directing the flux in a direction substantially orthogonal to the insensitive axis, whereby the flux path is directed through said torquer coil means.

14. The accelerometer of claim 8 wherein said magnetic means include a bar magnet having an axis orthogonal to the insensitive axis.

15. The accelerometer of claim 14 wherein said torquer means include a concentric coil positioned in the interior of the cup between the cup wall and said magnetic means.

16. An improved dynamically tuned gyroscope including a frame, motor means fixed to the frame and including a shaft, rotatable about a spin axis, the combination comprising:
   (1) an open interior cup shaped rotor coaxially aligned with the rotatable shaft;
   (2) flexural mounting means attached at one end to the shaft and rotatable therewith, and having a cylindrical opening at the other end adapted to receive said rotor;
   (3) connecting means joining the peripheral edge of said rotor to said other end of said mounting means permitting said rotor limited rotational movement about a first axis orthogonal to the spin axis;
   (4) magnetic means disposed in the interior of the cup of said cup shaped rotor; and
   (5) torquer coil means fixed to the frame but extending into the cup interior adjacent to said magnetic means and operable therewith for maintaining rotor rotation in a plane orthogonal to the spin axis,
whereby said flexural mounting means is accessible for balancing and adjusting means with the instrument otherwise assembled and operable.

17. The inertial instrument of claim 16 wherein said flexural mounting means permits said rotor limited rotational movement about a second axis, orthogonal to said first axis and to the spin axis.

18. The gyroscope of claim 17 wherein said torquer coil means include a first pair of coils positioned to apply restoring torques about said first axis and a second pair of coils positioned to apply restoring torques about said second axis.

19. The gyroscope of claim 16 wherein said magnetic means include at least a first disc shaped permanent magnet polarized in a direction parallel to the spin axis.

20. The gyroscope of claim 19 wherein said magnetic means further include second and third disc magnets, respectively, adjacent said first disc magnet, polarized in a direction parallel to the spin axis and having similar poles adjacent said first magnet for directing the flux in a direction substantially orthogonal to the spin axis, whereby the flux path is directed through said torquer coil means.

21. The gyroscope of claim 16 wherein said magnetic means include a bar magnet having an axis orthogonal to the spin axis.

22. The gyroscope of claim 21 wherein said torquer means include a concentric coil positioned in the interior of the cup between the cup wall and said magnetic means.

23. In an improved, dynamically tuned gyroscope including a housing, motor means fixed to the housing, a shaft coupled to the motor and rotatable about a spin axis, means for sensing attitude of a rotor and means for torquing a rotor:
   (a) a cup shaped rotor coaxially aligned with the rotatable shaft; and
   (b) suspension means external to said cup shaped rotor for symmetrically connecting said rotor to the shaft.

24. The gyro of claim 23 further including permanent magnet means disposed in the interior of said cup shaped rotor and the means for torquing extend into the interior of said cup shaped rotor between said permanent magnet means and the rotor wall for interacting with said magnet means.

25. The gyro of claim 24 wherein said permanent magnet means includes at least one disk magnet polarized axially and mounted concentrically within said cup shaped rotor.

26. The gyro of claim 24 wherein said permanent magnet means includes at least one bar magnet mounted in said cup shaped rotor.

27. The gyro of claim 26 wherein the means for torquing includes a circular coil concentric with the spin axis and which extends into said cup shaped rotor between said bar magnet and cup wall, for interacting with said bar magnet.

28. The gyro of claim 23 wherein the shaft and suspension are fabricated from a single piece of material and are permanently attached to each other.

29. The gyro of claim 23 wherein the shaft is coupled to the motor means with bearings and where the bearing inner races and shaft are fabricated from a single piece of material and are permanently attached to each other.

30. The gyro of claim 23 further including a header mounted at one end of the gyro next adjacent said cup shaped rotor to feed electrical signals through the housing.

31. In an improved accelerometer including a housing, a means for sensing the attitude of an inertial mass element, means of torquing the inertial mass element, and a central axis:
(a) a cup shaped inertial mass element coaxially aligned with the central axis of the accelerometer; and
(b) suspension means external to said cup shaped inertial mass element, and symmetrically connected thereto for permitting rotation about an axis orthogonal to the central axis, the center of gravity of said inertial mass element being displaced axially from center of said suspension means.

32. The accelerometer of claim 31 wherein permanent magnet means are disposed in the interior of said cup shaped inertial mass element and the means for torquing extend into the interior of said cup shaped inertial mass element between said permanent magnet means and the cup wall for interacting with said magnet means.

33. The accelerometer of claim 32 wherein said permanent agnet means includes at least one disk magnet polarized axially and mounted concentrically within said cup shaped inertial mass element.

34. The accelerometer of claim 32 wherein said permanent magnet means include at least one bar magnet whose magnetic axis is orthogonal to the central axis, mounted in said cup shaped inertial mass element.

35. The accelerometer of claim 34 wherein the means for torquing includes a circular coil concentric with the central axis and which extends into said cup shaped inertial mass element between said bar magnet and cup wall, for interacting with said bar magnet.

36. The accelerometer of claim 31 wherein said suspension means and the housing are fabricated from a single piece of material and are permanently attached to each other.

37. The accelerometer of claim 31 further including a header mounted at one end of the accelerometer next adjacent said cup shaped inertial mass to feed electrical signals through the housing.

38. In an improved single axis accelerometer including a housing, a central axis, means for sensing the attitude of an inertial mass element and means for torquing an inertial mass element:
(a) a cup shaped inertial mass element coaxially aligned with the central axis; and
(b) suspension means external to said cup shaped inertial means element and symmetrically mounted thereto for enabling rotation about an axis orthogonal to the central axis, the center of gravity of said inertial mass element being displaced radially from the center of said suspension.

39. The accelerometer of claim 38 wherein permanent magnet means are disposed in the interior of said cup shaped inertial mass element and the means for torquing extend into the interior of said cup shaped inertial mass element between said permanent magnet means and the cup wall for interacting with said magnet means.

40. The accelerometer of claim 39 wherein said permanent magnet means include at least one disk magnet polarized axially and mounted concentrically within said cup shaped inertial mass element.

41. The accelerometer of claim 39 wherein said permanent magnet means include at least one bar magnet whose magnetic axis is orthogonal to the central axis mounted in said cup shaped inertial mass element.

42. The accelerometer of claim 41 wherein the means for torquing includes a circular coil concentric with the central axis and which extends into said cup shaped inertial mass element between said bar magnet and cup wall, for interacting with said bar magnet.

43. The accelerometer of claim 38 wherein said suspension means and housing are fabricated from a single piece of material and are permanently attached to each other.

44. The accelerometer of claim 38 further including a header mounted at one end of the accelerometer next adjacent said cup shaped inertial mass element to feed electrical signals through the housing.

* * * * *